United States Patent
Mayer et al.

(10) Patent No.: US 8,154,427 B2
(45) Date of Patent: Apr. 10, 2012

(54) MULTITURN ROTARY ENCODER AND METHOD OF OPERATING A MULTITURN ROTARY ENCODER

(75) Inventors: Elmar Mayer, Nussdorf (DE); Erich Strasser, Trostberg (DE); Hermann Hofbauer, Trostberg (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 109 days.

(21) Appl. No.: 12/871,320

(22) Filed: Aug. 30, 2010

(65) Prior Publication Data

US 2011/0063145 A1    Mar. 17, 2011

(30) Foreign Application Priority Data

Sep. 14, 2009   (DE) .......................... 10 2009 029 431

(51) Int. Cl.
*H03M 1/22*    (2006.01)
(52) U.S. Cl. .................. 341/2; 250/231.13; 250/231.15; 250/231.18; 341/16
(58) Field of Classification Search .................. 341/2, 9, 341/10, 16; 250/213.13, 213.15, 213.18
See application file for complete search history.

(56) References Cited

U.S. PATENT DOCUMENTS

| | | | |
|---|---|---|---|
| 6,542,088 B1 * | 4/2003 | Bielski et al. .................... | 341/15 |
| 6,683,545 B2 * | 1/2004 | Strasser ........................... | 341/16 |
| 7,406,772 B2 | 8/2008 | Siraky | |
| 2003/0112157 A1 * | 6/2003 | Strasser ........................... | 341/2 |
| 2005/0115087 A1 * | 6/2005 | Noltemeyer .................. | 33/1 PT |
| 2011/0196648 A1 * | 8/2011 | Mayer et al. .................. | 702/151 |

FOREIGN PATENT DOCUMENTS

| | | |
|---|---|---|
| DE | 28 17 172 | 10/1979 |
| EP | 1 457 762 | 9/2004 |
| EP | 1 462 771 | 9/2004 |

\* cited by examiner

*Primary Examiner* — Lam T Mai
(74) *Attorney, Agent, or Firm* — Kenyon & Kenyon LLP

(57) ABSTRACT

A multiturn rotary encoder includes: a single-turn unit, including a code carrier and a single-turn evaluation unit for processing single-turn position signals to form a single-turn code word; a first multiturn unit, including at least one first multiturn code carrier and a first multiturn evaluation unit for processing first multiturn position signals to form a first multiturn code word that indicates the number of revolutions covered by input shaft; and a second multiturn unit, including at least one second multiturn code carrier and a second multiturn evaluation unit for processing second multiturn position signals to form a second multiturn code word that likewise indicates the number of revolutions covered by the input shaft. The functioning of the multiturn units is ascertainable by the multiturn code words generated independently of each other.

10 Claims, 5 Drawing Sheets

MULTITURN ROTARY ENCODER AND METHOD OF OPERATING A MULTITURN ROTARY ENCODER

CROSS-REFERENCE TO RELATED APPLICATIONS

The present application claims priority to Application No. 10 2009 029 431.7, filed in the Federal Republic of Germany on Sep. 14, 2009, which is expressly incorporated herein in its entirety by reference thereto.

FIELD OF THE INVENTION

The present invention relates to a multiturn rotary encoder and a method of operating a multiturn rotary encoder.

BACKGROUND INFORMATION

Position-measuring devices for measuring the angular position of a shaft are familiar from a multitude of publications. Such position-measuring devices are referred to as rotary encoders. Moreover, if a position-measuring device is arranged such that, in addition to the angular position of the shaft, it is also possible to measure the number of revolutions covered, it is referred to as a multiturn rotary encoder.

In principle, two approaches are conventional for implementing the multiturn unit, e.g., the unit for determining the number of revolutions covered by the shaft. For example, there are multiturn units based on gears, and there are multiturn units based on counters.

In the case of gear-based multiturn units, the input shaft actuates one or perhaps several gear stages which gear down the input speed. Given a gear stage having a reduction ratio of 16:1, for example, the output shaft of the gear stage rotates one time per 16 revolutions of the input shaft. The output shaft in turn drives a code carrier, whose angular position allows conclusions about the number of revolutions of the input shaft per unit time.

An example for a gear-based multiturn rotary encoder is described in German Patent No. 28 17 172, which relates to a multi-stage incremental shaft encoder having a first angular-increment code disk and a plurality of downstream angular-increment code disks.

European Published Patent Application No. 1 457 762 describes a device for measuring the position, the displacement, or the rotational angle of an object. It includes three measuring standards in the form of three successive code disks, which are coupled via a differential toothed gear. The code disks are scanned by a scanning unit radially covering the code tracks of all code disks.

Counter-based multiturn units ascertain the number of revolutions covered by a shaft by counting the revolutions of a code carrier which is driven directly by the shaft, and therefore covers the same number of revolutions as the shaft to be measured. Located on the code carrier is a code, which is scanned by a scanning unit. Based on the position signals ascertained by the scanning unit, counting signals are generated in counter electronics for a counter which counts, as a function of the direction of rotation, the number of complete revolutions of the code carrier, and therefore of the shaft. In order to store the counter reading of the counter even when the main power supply is switched off, for example, when the machine in which the multiturn rotary encoder is operated is switched off, and moreover, to maintain the counting function, counter-based multiturn units are frequently equipped with a battery which takes over the energy supply for at least the multiturn unit of the rotary encoder in the event of a failure of the main power supply.

For example, European Patent No. 1 462 771 describes a multiturn rotary encoder having a counter-based multiturn unit.

While the functioning of the multiturn unit during normal operation—that is, when in addition to the multiturn unit, a single-turn unit for measuring the angular position within one revolution of the shaft is also active—can be checked by the single-turn unit (the number of revolutions measured by the multiturn unit must of necessity change when the single-turn unit determines one complete revolution), a failure of the multiturn unit remains undetected in the event the main power supply is switched off.

SUMMARY

Example embodiments of the present invention provide a multiturn rotary encoder which exhibits increased functional reliability.

According to example embodiments of the present invention, a multiturn rotary encoder includes a single-turn unit, a first multiturn unit and a second multiturn unit. The single-turn unit includes a code carrier which is able to be scanned by a single-turn scanner in order to generate single-turn position signals, and a single-turn evaluation unit for processing the single-turn position signals to form a single-turn code word which indicates the absolute position of an input shaft within one revolution. The first multiturn unit includes at least one first multiturn code carrier which is scannable by a first multiturn scanner in order to generate first multiturn position signals, and a first multiturn evaluation unit for processing the first multiturn position signals to form a first multiturn code word that indicates the number of revolutions covered by the input shaft. The second multiturn unit includes at least one second multiturn code carrier which is scannable by a second multiturn scanner in order to generate second multiturn position signals, and a second multiturn evaluation unit for processing the second multiturn position signals to form a second multiturn code word likewise indicating the number of revolutions covered by the input shaft.

The functioning of the multiturn units is able to be determined by the two multiturn code words generated independently of each other.

The multiturn rotary encoder may include a comparator unit adapted to receive the multiturn code words and adapted to generate a status flag which indicates functioning of the multiturn units.

The multiturn rotary encoder may include an interface unit adapted to transmit to a sequential electronics system at least one multiturn code word and the status flag.

The multiturn rotary encoder may include an interface unit adapted to transmit to a sequential electronics system for further evaluation the single-turn code word, the first multiturn code word, and the second multiturn code word.

The first multiturn unit may be arranged as a counter-based multiturn unit.

The second multiturn unit may be arranged as a gear-based multiturn unit.

The multiturn rotary encoder may include a comparator adapted to compare the first multiturn code word and the second multiturn code word and to determine whether the first multiturn unit and the second multiturn unit are functioning based on the comparison.

According to an example embodiment of the present invention, a method of operating a multiturn rotary encoder includes: generating single-turn position signals by a single-turn unit of the multiturn rotary encoder; processing the single-turn position signals to form a single-turn code word that indicates an absolute position of an input shaft within one revolution; generating first multiturn position signals by a first multiturn unit of the multiturn rotary encoder; processing the first multiturn position signals to form a first multiturn code word that indicates a number of revolutions covered by the input shaft; generating second multiturn position signals by a second multiturn unit of the multiturn rotary encoder; processing the second multiturn position signals to form a second multiturn code word that also indicates a number of revolutions covered by the input shaft; comparing the first multiturn code word and the second multiturn code word to determine whether the first multiturn unit and the second multiturn unit are functioning; and generating a status flag based on the comparison.

Further features and aspects of example embodiments of the present invention are described in more detail below with reference to the appended Figures.

DETAILED DESCRIPTION

Figure 1:
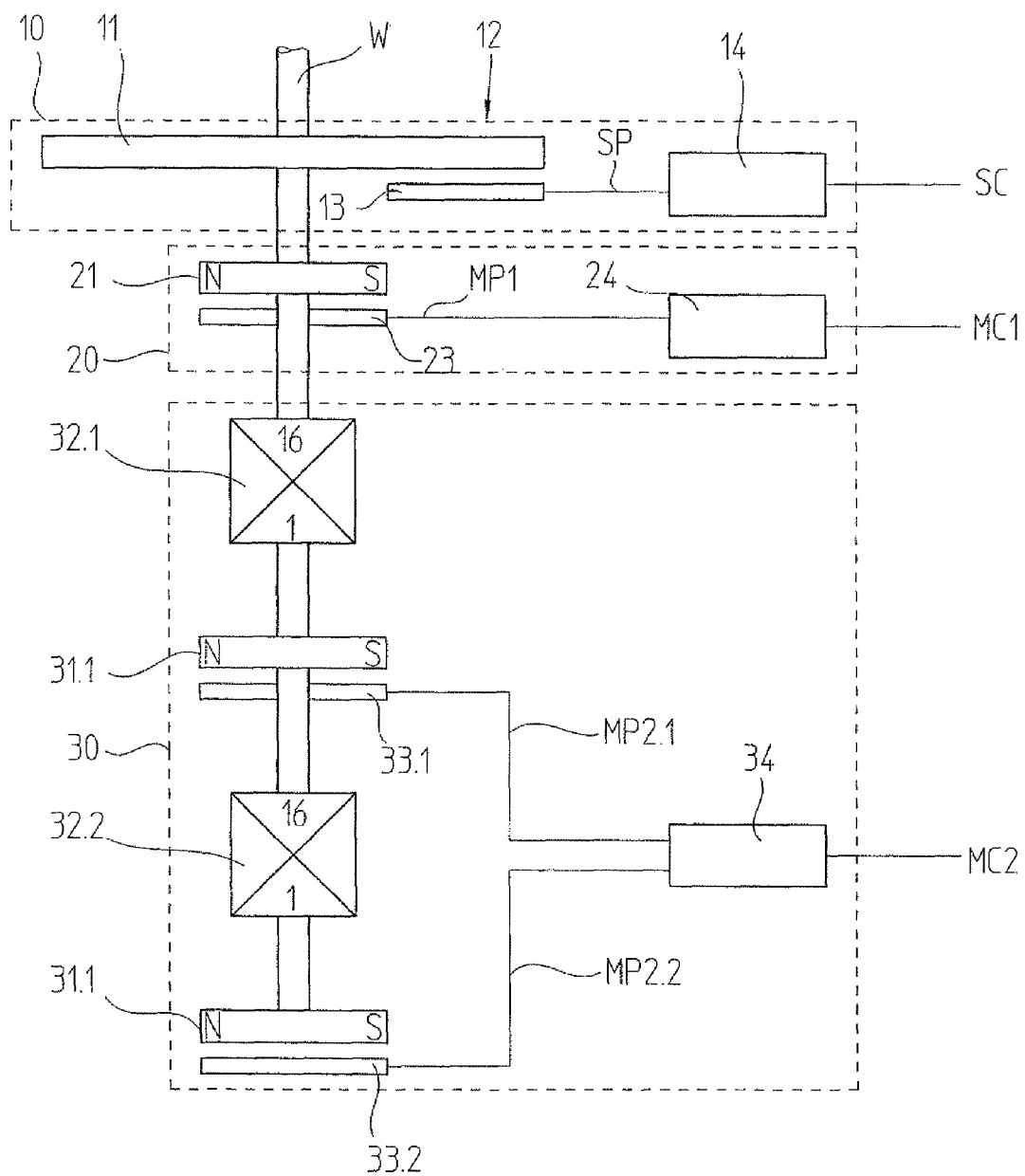
FIG. 1 schematically illustrates a multiturn rotary encoder according to an exemplary embodiment of the present invention.

FIG. 1 illustrates the principle of a multiturn rotary encoder according to an example embodiment of the present invention. The multiturn rotary encoder includes a single-turn unit 10, a first multiturn unit 20, and a second multiturn unit 30.

Single-turn unit 10 includes a code disk 11, which is coupled directly to an input shaft W to be measured. Code disk 11 bears a coding 12, able to be scanned photoelectrically, magnetically, capacitively, inductively, etc., in order to split one revolution of input shaft W into a plurality of distinguishable sectors. As a rule, this coding 12 is a multi-track code, e.g., a Gray code, but may also be formed by a single-track chain code, what is referred to as a "pseudo random code" (PRC). Coding 12 is scanned by a scanner 13 in order to form single-turn position signals SP. Single-turn position signals SP are fed to a single-turn evaluation unit 14 which forms and outputs at its output a multi-digit single-turn code word SC that indicates the absolute position of input shaft W within a single revolution.

Multiturn units 20, 30 are provided to ascertain the number of revolutions of input shaft W per unit time.

First multiturn unit 20 is a counter-based multiturn unit and includes a first multiturn code carrier 21, which is likewise connected in rotatably fixed manner to input shaft W. First multiturn code carrier 21 has a single magnetic dipole, e.g., a north and a south pole. The poles are scanned by a first multiturn scanner 23. It has a plurality of sensor elements sensitive to magnetic fields, by which first multiturn position signals MP1 are able to be generated, from which, in a first multiturn evaluation unit 24, a first multiturn code word MC1 may be formed which indicates the absolute position of first multiturn code carrier 21. For example, the sensor elements are Hall sensors, MR (magnetoresistive) sensors, GMR (giant magneto-resistance) sensors, etc. The sensor elements and first multiturn evaluation unit 24 may be integrated together on one semiconductor substrate.

Figure 2:
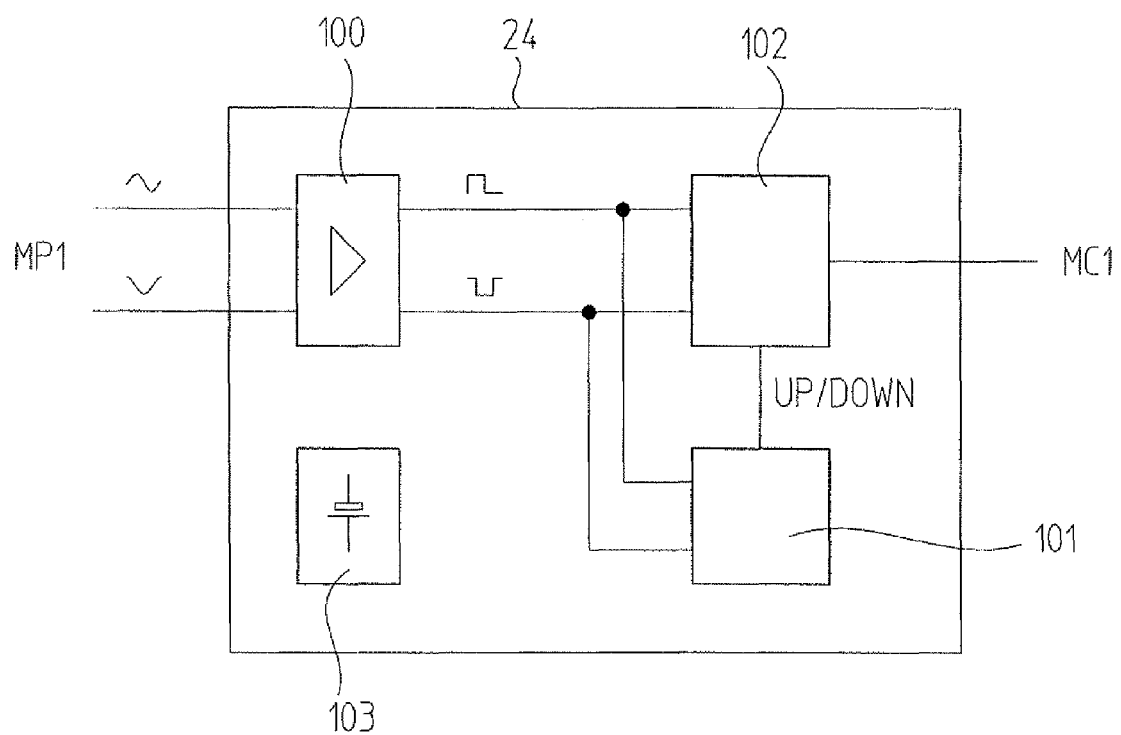
FIG. 2 schematically illustrates the first multiturn evaluation unit of a multiturn rotary encoder, such as that illustrated in FIG. 1.

FIG. 2 schematically illustrates a first multiturn evaluation unit 24. In this context, it is assumed that first multiturn position signals MP1 include two signals which have a largely sinusoidal characteristic and pass through one complete period of the sinusoidal oscillation during one revolution of input shaft W. Usually these two signals have a phase shift of approximately 90° relative to each other, making it possible to determine the direction of rotation of input shaft W.

In multiturn evaluation unit 24, first multiturn position signals MP1 are first fed to a signal-shaping unit 100 which, from the sinusoidal input signals, forms digital square-wave counting signals that it supplies first of all to a direction discriminator 101, and secondly, to a counter unit 102. Direction discriminator 101 determines the direction of rotation from the time sequence of the edges of the counting signals, and transmits it as direction signal UP/DOWN to counter unit 102. Counter unit 102 in turn uses at least one rising or falling edge of the counting signals, as well as direction signal UP/DOWN, for the direction-dependent counting of the revolutions of input shaft W.

Also included in first multiturn evaluation unit 24 is a battery 103. It supplies power to all components necessary for the counting operation, possibly also first multiturn scanner 23, in the event the main power supply is switched off (e.g., if the machine in which the multiturn rotary encoder is operated is shut down). This ensures that even when disconnected from the supply, any revolutions of input shaft W are counted, and thus, after the switch-on operation, a first multiturn code word MC1 having the correct number of revolutions covered by input shaft W is available.

At this juncture, it should be pointed out specifically that there are widely differing variants of counter-based multiturn units, especially variants which, when disconnected from the supply, are operated in pulsed fashion in order to save power, as well as variants which need no battery since, for example, using a pulse-wire sensor (also referred to as Wiegand wire), they obtain the energy needed for the counting operation from magnetic-field fluctuations during one revolution of input shaft W, and store the counter reading between the counting operations in a non-volatile memory.

Second multiturn unit 30 is a gear-based multiturn unit which, for example, is shown with two gear stages 32.1, 32.2. The number of gear stages needed is largely a function of the number of revolutions of input shaft W to be determined, as well as the number of revolutions determinable with one gear stage. If only a few revolutions of input shaft W are to be measured, then one gear stage may be sufficient. On the other hand, three and more gear stages may be necessary to determine the revolutions of a feed screw of a machine tool.

First gear stage 32.1 is coupled directly to input shaft W. It has a 16-fold gear reduction and its output shaft is in turn coupled to second gear stage 32.2 which likewise performs a reduction by the factor 16. Gear stages 32.1, 32.2 drive second multiturn code carriers 31.1, 31.2, respectively, which are scanned by second multiturn scanners 33.1, 33.2 in order to generate second multiturn position signals MP2.1, MP2.2. The information as to in which of the countable revolutions input shaft W is at the moment is coded in the angular position of second multiturn code carriers 31.1, 31.2. As already the case for first multiturn code carrier 21, second multiturn code carriers 31.1, 31.2 are formed from only one magnetic dipole. Thus, second multiturn code carriers 31.1, 31.2 are scanned analogously to the scanning of first multiturn code carrier 21. Deviating from multiturn position signals MP1 of first multiturn unit 20, however, second multiturn position signals MP2.1, MP2.2 are interpolated in a second multiturn evaluation unit 34, that is, instantaneous values of multiturn position signals MP2.1, MP2.2 are assigned absolute values which indicate the angular position of respective multiturn code carriers 31.1, 31.2. The resolution of the instantaneous values corresponds at least to the reduction ratio of the associated gear stage. Finally, second multiturn evaluation unit 34 processes the ascertained absolute values of second multiturn position signals MP2.1, MP2.2 to form a second multiturn code word MC2.

In addition to the variant described here having a multistage reduction gear, gear-based multiturn units which, like European Published Patent Application No. 1 457 762 mentioned at the outset proposes, are based on a differential toothed gear are also suitable in the system described herein.

Due to the two multiturn units 20, 30 provided, two multiturn code words MC1, MC2 formed independently of each other are available in the multiturn rotary encoder. By comparing these two multiturn code words MC1, MC2, it is possible to determine whether the two multiturn units 20, 30 are functioning. In particular, this also holds true when the multiturn rotary encoder, that is, the machine in which the multiturn rotary encoder is operated, is switched on again after a shut-down phase.

Figure 3:
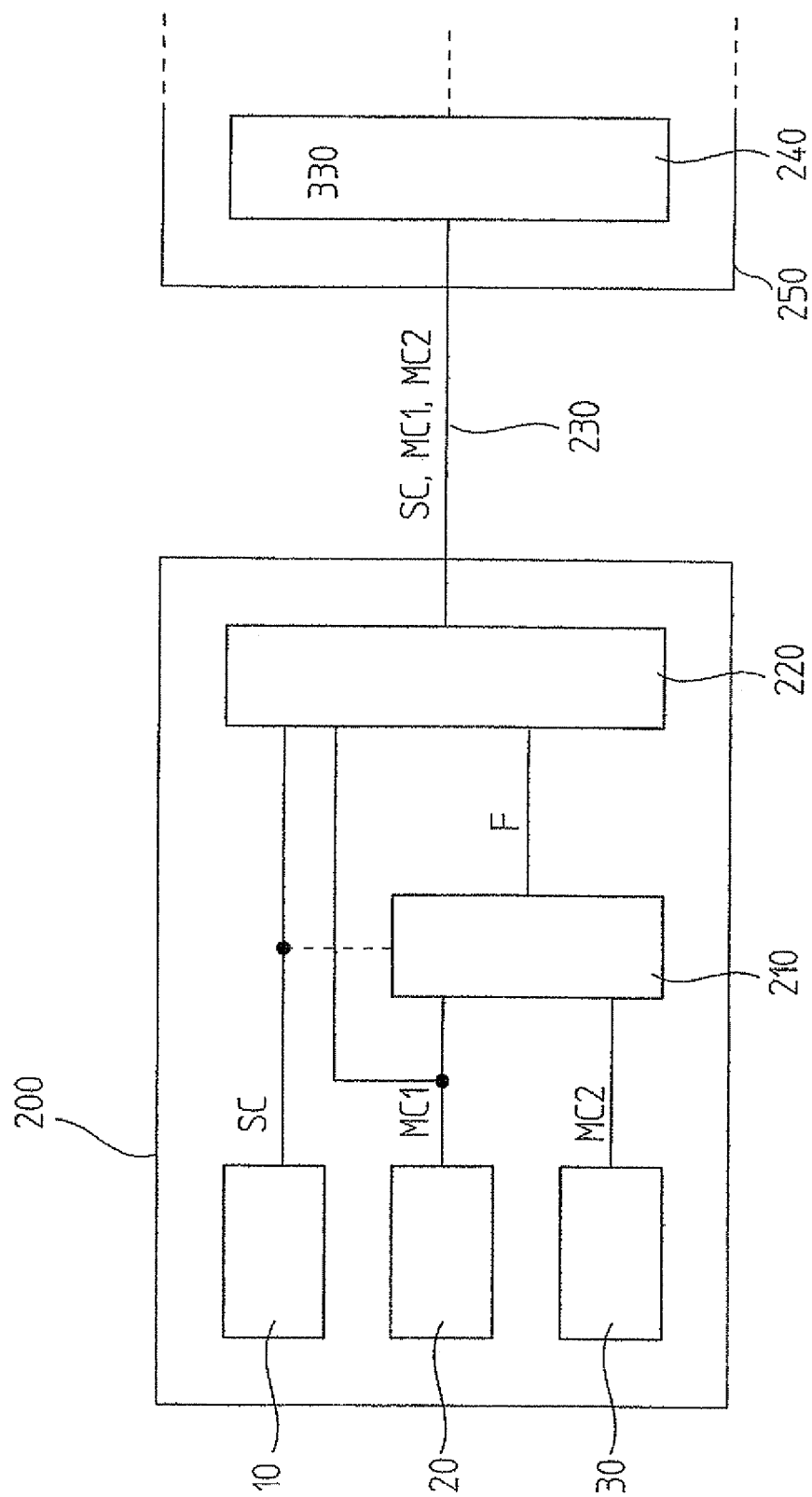
FIG. 3 schematically illustrates an example for the evaluation of multiturn code words.
Figure 4:
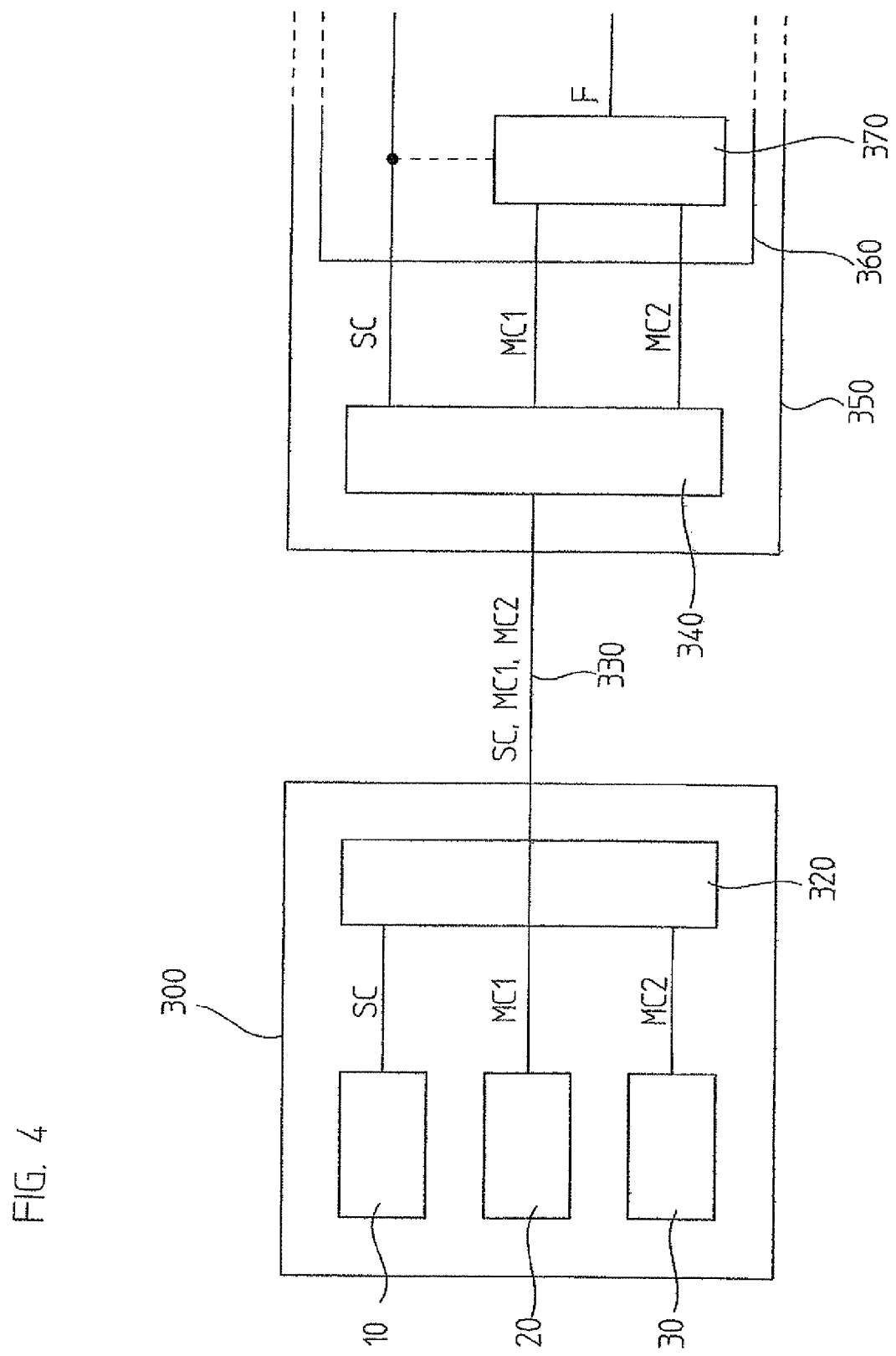
FIG. 4 schematically illustrates an example for the evaluation of multiturn code words.

FIGS. 3 and 4 show exemplary embodiments for further processing or evaluation of multiturn code words MC1, MC2.

FIG. 3 shows a multiturn rotary encoder 200 which, in addition to single-turn unit 10, first multiturn unit 20 and second multiturn unit 30, also includes a comparator unit 210 to which multiturn code words MC1, MC2 are supplied. By comparing the values of multiturn code words MC1, MC2, comparator unit 210 determines deviations and outputs a status flag F as a function of the result of the comparison. Single-turn code word SC, at least one of multiturn code words MC1, MC2 (first multiturn code word MC1 in the example shown), as well as status flag F are fed to an interface unit 220, by which the values are transmittable via a data-transmission channel 230 to a further interface unit 240 in a sequential electronics system 250. It is able to evaluate status flag F and, in case of a fault, induce suitable measures, e.g., bringing the machine to an orderly stop.

Data-transmission channel 230 is arranged, for example, in the form of a bidirectional, serial interface connection via which commands, particularly commands requesting position data, are transmittable from sequential electronics system 250 to multiturn rotary encoder 200, and response data, especially single-turn code word SC, multiturn code words MC1, MC2 and status flag F, are transmittable in the reverse direction. The transmission is carried out with the aid of serial data streams. In comparison to conventional multiturn rotary encoders, the transmission of status flag F, which in the simplest case is really made up of just one bit, prolongs the data-transmission duration merely by the transmission time for one bit.

On the other hand, FIG. 4 shows a multiturn rotary encoder 300 which, in addition to single-turn unit 10, first multiturn unit 20 and second multiturn unit 30, further includes just one interface unit 320, to which single-turn code word SC and multiturn code words MC1, MC2 are fed. All code words SC, MC1, MC2 are transmittable via one data-transmission channel 330 to a further interface unit 340 in a sequential electronics system 350. Disposed in a control unit 360 in sequential electronics system 350 is a comparator unit 370, to which multiturn code words MC1, MC2 arriving at interface unit 340 via data-transmission channel 330 are supplied. Analogous to comparator unit 210 illustrated in FIG. 3, comparator unit 370 is able to compare multiturn code words MC1, MC2 and generate status flag F, which is taken into account appropriately in control unit 360.

Since in this exemplary embodiment, two multiturn code words MC1, MC2, which are generated completely independently of each other in multiturn rotary encoder 300, are transmitted to sequential electronics system 350, not only faults in multiturn units 20, 30, but also errors in the data transmission from multiturn rotary encoder 300 via data-transmission channel 330 to sequential electronics system 350 are also able to be determined. Data-transmission channel 330 may be arranged in the form of a bidirectional, serial interface connection in this example, as well.

During running operation, the correct functioning of a multiturn unit 20, 30 may also be determined with the aid of single-turn code word SC, since there is a direct correlation between the ascertainment of one complete revolution of input shaft W and the change of multiturn code words MC1, MC2. In other words, multiturn code words MC1, MC2 must of necessity change by one specified increment when the completion of one revolution of shaft W is recognized with the aid of single-turn code word SC. Therefore, with respect to the example in FIG. 4, for example, after multiturn code words MC1, MC2 have been compared one time, status flag F may also be obtained on the basis of a comparison between single-turn code word SC and at least one of multiturn code words MC1, MC2. This means that it may be sufficient to check multiturn code words MC1, MC2 for equality merely at suitable points in time, e.g., after the machine, that is, the multiturn rotary encoder is switched on, and after this check test, to transmit just one of multiturn code words MC1, MC2 via data-transmission channel 330 to the sequential electronics system, and to check the functioning of multiturn unit 20, 30, used in running operation, with the aid of single-turn code word SC. In this manner, the volume of data to be transmitted may be reduced.

Figure 5:
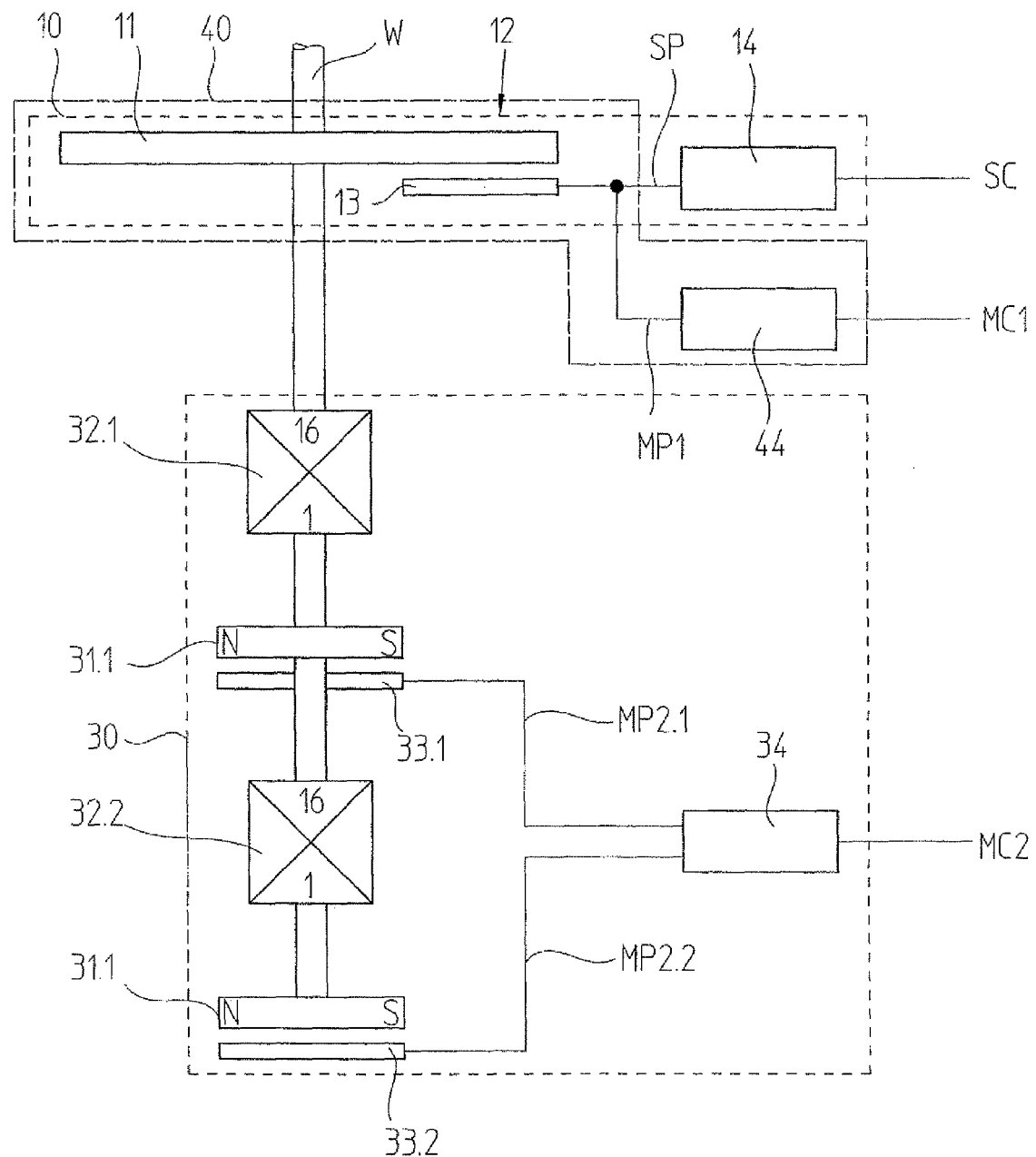
FIG. 5 schematically illustrates a multiturn rotary encoder according to an example embodiment of the present invention.

FIG. 5 illustrates the principle of a second multiturn rotary encoder. It likewise includes a single-turn unit 10, a first multiturn unit 40, and a second multiturn unit 30. Single-turn unit 10 and second multiturn unit 30 correspond to the units described in connection with FIG. 1, and are therefore not discussed again.

On the other hand, first multiturn unit 40 makes use of the fact that single-turn position signals SP, which result from the scanning of code 12 on code carrier 11 by single-turn scanner 13, may also be utilized to form a first multiturn code word MC1. Therefore, single-turn position signals SP are supplied, at least in part, as first multiturn position signals MP1 to a first multiturn processing unit 44, which generates and counts counting signals for forming first multiturn code word MC1. Thus, first multiturn unit 40 is a counter-based multiturn unit.

In this exemplary embodiment, code carrier 11 together with code 12, as well as single-turn scanner 13 are to be assigned to first multiturn unit 40.

This arrangement is usable particularly advantageously especially when code 12 is implemented such that scanning signals are obtained which have a period duration that corresponds to the revolution of input shaft W.

What is claimed is:

1. A multiturn rotary encoder comprising:
   a single-turn unit, including a code carrier that is scannable by a single-turn scanner to generate single-turn position signals, and a single-turn evaluation unit adapted to process the single-turn position signals to form a single-turn code word that indicates an absolute position of an input shaft within one revolution;

a first multiturn unit, including at least one first multiturn code carrier that is scannable by a first multiturn scanner to generate first multiturn position signals, and a first multiturn evaluation unit adapted to process the first multiturn position signals to form a first multiturn code word that indicates a number of revolutions covered by the input shaft; and a second multiturn unit, including at least one second multiturn code carrier that is scannable by a second multiturn scanner to generate second multiturn position signals, and a second multiturn evaluation unit adapted to process the second multiturn position signals to form a second multiturn code word that also indicates the number of revolutions covered by the input shaft.

2. The multiturn rotary encoder according to claim 1, further comprising a comparator unit adapted to receive the multiturn code words and adapted to generate a status flag which indicates functioning of the multiturn units.

3. The multiturn rotary encoder according to claim 2, further comprising an interface unit adapted to transmit to a sequential electronics system at least one multiturn code word and the status flag.

4. The multiturn rotary encoder according to claim 1, further comprising an interface unit adapted to transmit to a sequential electronics system for further evaluation the single-turn code word, the first multiturn code word, and the second multiturn code word.

5. The multiturn rotary encoder according to claim 1, wherein the first multiturn unit is arranged as a counter-based multiturn unit.

6. The multiturn rotary encoder according to claim 1, wherein the second multiturn unit is arranged as a gear-based multiturn unit.

7. The multiturn rotary encoder according to claim 1, further comprising a comparator adapted to compare the first multiturn code word and the second multiturn code word and to determine whether the first multiturn unit and the second multiturn unit are functioning based on the comparison.

8. A method of operating a multiturn rotary encoder, comprising:

generating single-turn position signals by a single-turn unit of the multiturn rotary encoder;

processing the single-turn position signals to form a single-turn code word that indicates an absolute position of an input shaft within one revolution;

generating first multiturn position signals by a first multiturn unit of the multiturn rotary encoder;

processing the first multiturn position signals to form a first multiturn code word that indicates a number of revolutions covered by the input shaft;

generating second multiturn position signals by a second multiturn unit of the multiturn rotary encoder;

processing the second multiturn position signals to form a second multiturn code word that also indicates a number of revolutions covered by the input shaft;

comparing the first multiturn code word and the second multiturn code word to determine whether the first multiturn unit and the second multiturn unit are functioning; and generating a status flag based on the comparison.

9. The method according to claim 8, wherein the first multiturn unit is arranged as a counter-based multiturn unit.

10. The method according to claim 8, wherein the second multiturn unit is arranged as a gear-based multiturn unit.

* * * * *